(12) United States Patent
Svidler

(10) Patent No.: US 10,885,815 B1
(45) Date of Patent: Jan. 5, 2021

(54) MODULAR MULTI-COMPUTER MONITOR STAND SYSTEM FOR MULTI-COMPUTER MONITOR SETUP

(71) Applicant: Ilya Svidler, Staten Island, NY (US)

(72) Inventor: Ilya Svidler, Staten Island, NY (US)

( * ) Notice: Subject to any disclaimer, the term of this patent is extended or adjusted under 35 U.S.C. 154(b) by 0 days.

(21) Appl. No.: 16/789,733

(22) Filed: Feb. 13, 2020

(51) Int. Cl.
    *G06F 9/302*     (2018.01)
    *F16M 11/04*     (2006.01)
    *G09F 9/302*     (2006.01)
    *F16M 11/14*     (2006.01)

(52) U.S. Cl.
    CPC ......... *G09F 9/3026* (2013.01); *F16M 11/045* (2013.01); *F16M 11/14* (2013.01); *F16M 2200/028* (2013.01); *F16M 2200/08* (2013.01); *G06F 2200/1612* (2013.01); *G09G 2300/026* (2013.01)

(58) Field of Classification Search
    CPC .... G09F 9/3026; F16M 11/045; F16M 11/14; F16M 2200/028; F16M 2200/08; G06F 2200/1612; G09G 2300/026
    See application file for complete search history.

(56) References Cited

U.S. PATENT DOCUMENTS

| | | | |
|---|---|---|---|
| 6,729,054 B1 | 5/2004 | VanderTuin | |
| 8,596,599 B1 * | 12/2013 | Carson | F16M 11/041 248/429 |
| 9,395,472 B2 | 7/2016 | Kim et al. | |
| 9,443,451 B2 | 9/2016 | Sutherland et al. | |
| 9,903,567 B2 | 2/2018 | Lan et al. | |
| 10,354,564 B2 | 7/2019 | Topousis et al. | |
| 2006/0238967 A1 * | 10/2006 | Carson | F16M 11/14 361/679.04 |
| 2011/0233346 A1 * | 9/2011 | Schluter | F16M 11/041 248/65 |
| 2016/0010836 A1 | 1/2016 | Patterson et al. | |
| 2016/0369980 A1 | 12/2016 | Lan et al. | |
| 2017/0011669 A1 | 1/2017 | Meersman et al. | |
| 2017/0198890 A1 | 7/2017 | Jurewicz et al. | |
| 2018/0220537 A1 * | 8/2018 | Heo | G09F 9/3026 |
| 2018/0350277 A1 | 12/2018 | Entwistle | |

* cited by examiner

*Primary Examiner* — Anita M King
(74) *Attorney, Agent, or Firm* — Goldstein Law Offices, P.C.

(57) ABSTRACT

A modular multi-computer monitor stand system for multi-computer monitor setups is disclosed. The stand system provides various discrete interlocking components including a rail, slide members, elongated legs, base members and mounting plates that modularly interconnect to form an upright stand capable of holding multiple computer monitors thereon. The rail includes various grooves for slidably receiving the slide members. The slide members include projections slidably engageable with the grooves of the elongated rail and interlocking regions detachably engageable with the base members and the mounting plates. The base members include interlocking receptacles detachably engageable with the elongated legs and interlocking regions detachably engageable with the interlocking regions of the slide members. The mounting plates include interlocking regions detachably engageable with the interlocking regions of the slide members and universally positioned apertures for fastening the mounting plate to any type of computer monitor.

20 Claims, 12 Drawing Sheets

MODULAR MULTI-COMPUTER MONITOR STAND SYSTEM FOR MULTI-COMPUTER MONITOR SETUP

TECHNICAL FIELD

The present disclosure relates generally to computer monitors and devices and systems for mounting and positioning computer monitors into a multiple computer monitor setup. More particularly, the present disclosure relates to a multi-computer monitor stand system having various modular components that detachably connect to one another as desired to form a bracket configured to receive and support any number of monitors thereon.

BACKGROUND

Multi-computer monitor setups are required or desirable for working effectively and efficiently in a variety of professional fields. Indeed, it has become commonplace for individuals to create workstations, either at home or at the office, having multiple monitor setups. For example, in the information technology and financial fields, it is desirable to have multiple computer monitor displays for multitasking, comparing documents, conducting research, and increasing productivity overall.

Multi-computer monitor setups are typically stationary as they require large, heavy, and generally cumbersome stands that are capable of receiving and supporting a desired quantity of monitors thereon. However, increasingly, individuals desire portable multi-computer setups that can be easily dismantled, stored, and transported for convenient setup and use on the go. Indeed, until recently, the portability of multiple computer monitor set ups was not considered, but the development of slim design USB monitors has made it easier to store and transport multiple computer monitors.

Accordingly, there is a need for a universal multi-computer monitor stand system for a multi-computer monitor setup that has various modular components that detachably connect to one another for easy dismantling and portability and that are easily assembled to various degrees to receive and support any number of monitors thereon.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a portable multi-computer monitor stand system. Accordingly, the present disclosure provides a multi-computer monitor stand including various discrete components that detachably connect to one another in modular fashion to facilitate assembly, disassembly, storage, and carrying.

An aspect of an example embodiment in the present disclosure is to provide a multi-computer monitor stand system that is scalable in extent and size to receive and support any number of computer monitors, thereby enabling assembly of multi-computer monitor setups having a wide range of computer monitors. Accordingly, the present disclosure provides various discrete components that detachably connect to one another in modular fashion to form a stand assembly having the capacity to hold a specifically desired amount of monitors thereon.

An aspect of an example embodiment in the present disclosure is to provide a multi-computer monitor stand system capable of receiving and supporting any type of computer monitor or display. Accordingly, the present disclosure provides a universal mounting plate configured to detachably connect to the rear of any type of computer monitor.

An aspect of an example embodiment in the present disclosure is to provide a multi-computer monitor stand system that detachably connects through universal interlocking members. Accordingly, the present disclosure provides a multi-computer monitor stand system including various discrete components each including interlocking members and that connect to each other via a friction fit and/or magnetically.

An aspect of an example embodiment in the present disclosure is to provide a multi-computer monitor stand system that is capable of holding a computer monitor in both landscape and portrait orientations. Accordingly, the present disclosure provides laterally extending rails including a longitudinal length that is larger than a length and a width of a computer monitor to be mounted onto the stand system.

An aspect of an example embodiment in the present disclosure is to provide a multi-computer monitor stand system that is capable of pivoting so as to enable selective positional arrangement of computer monitors mounted onto the stand system. Accordingly, the present disclosure provides laterally extending rails connected by a pivot that enables the rails to pivot 180 degrees.

An aspect of an example embodiment in the present disclosure is to provide a multi-computer monitor stand system that enables lateral adjustment of a computer monitor mounted onto the stand system. Accordingly, the present disclosure provides slide mechanisms that interlock with computer monitors and that are longitudinally slidable about the lateral rails so as to enable lateral adjustment of the computer monitor when mounted onto the stand system.

An aspect of an example embodiment in the present disclosure is to provide a multi-computer monitor stand system that can be dissembled into a flat configuration for easy and compact storage. Accordingly, the present disclosure provides discrete modular components which include substantially the same width or height such that when the discrete modular components are rested flat on a surface they are substantially coplanar and level.

An aspect of an example embodiment in the present disclosure is to provide a multi-computer monitor stand system including components that can bend into a compact configuration. Accordingly, the present disclosure provides laterally extending rails that are coplanar and pivotable 180 degrees with respect to one another about a common plane so as to bend toward one another and abut into a compact configuration.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
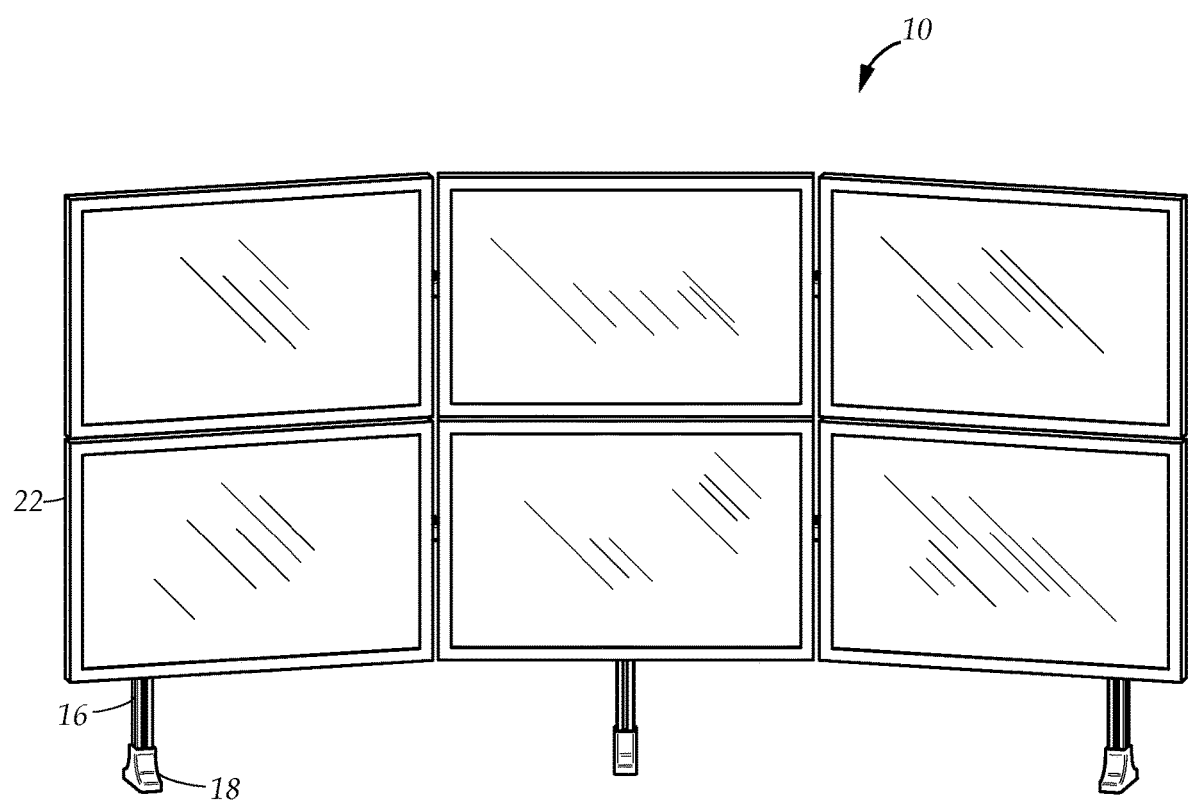
FIG. 1 is a perspective front view of the multi-computer monitor stand system, illustrating multiple computers mounted onto the assembled stand system to form a multi-computer monitor setup having multiple computer monitors arranged in a stacked configuration according to one embodiment of the present disclosure.
Figure 2:
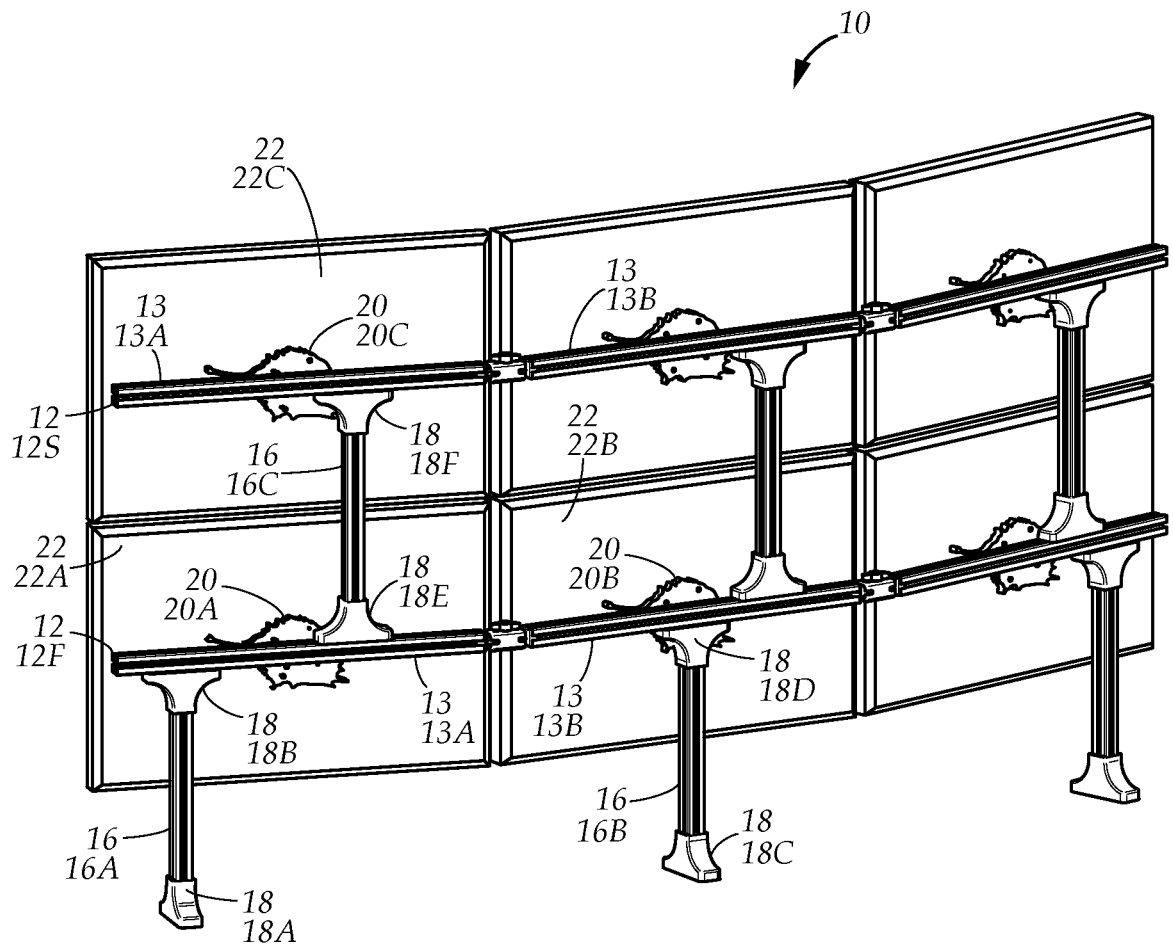
FIG. 2 is a perspective rear view of the multi-computer monitor stand system, illustrating one manner in which the stand system modularly assembles to have the capacity to receive multiple computer monitors to form a multi-computer monitor setup having multiple computer monitors arranged in a stacked configuration according to one embodiment of the present disclosure.
Figure 3:
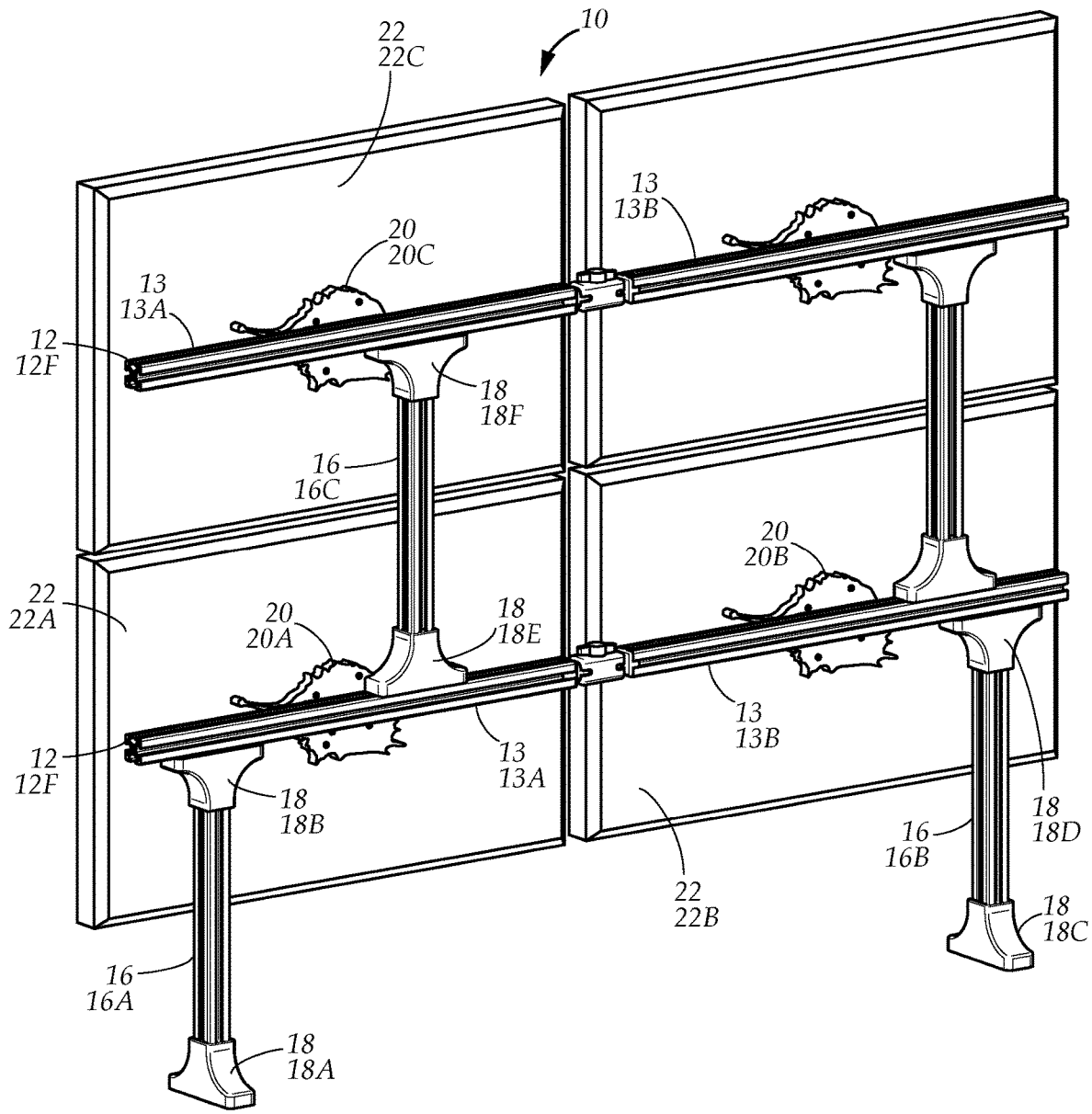
FIG. 3 is a perspective rear view of the multi-computer monitor stand system, illustrating another manner in which the stand system modularly assembles to have the capacity to receive multiple computer monitors to form a multi-computer monitor setup having multiple computer monitors arranged in a stacked configuration according to one embodiment of the present disclosure.
Figure 4:
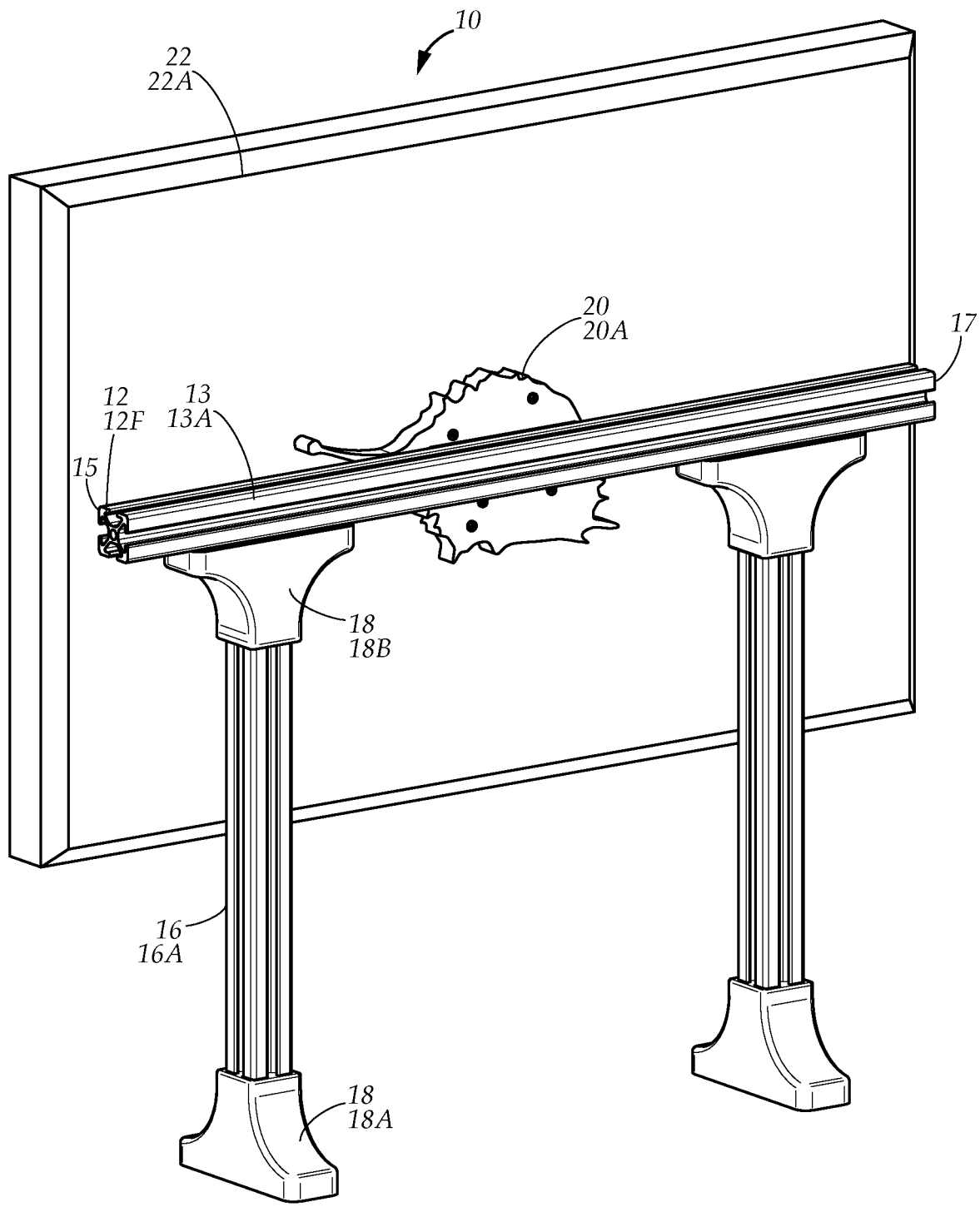
FIG. 4 is a perspective rear view of the multi-computer monitor stand system, illustrating yet another manner in which the stand system modularly assembles to have the capacity to receive a computer monitor according to one embodiment of the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION

FIGS. 1-4 illustrate a multi-computer monitor stand system 10 for multiple computer monitor setups comprising an elongated rail 12, at least two slide members 14 (see FIGS. 6 and 7) configured to detachably connect to the elongated rail 12, at least two elongated legs 16 configured to position the elongated rail 12 horizontally, at least two base members 18 configured to detachably connect to the elongated legs 16 and the slide members 14 to interconnect the elongated legs 16 and the elongated rail 12, and a mounting plate 20 configured to detachably connect a computer monitor 22 and the slide members 14 to interconnect the computer monitor 22 to the elongated rail 12.

The elongated rail 12, the at least two slide members 14, the at least two elongated legs 16, the at least two base members 18, and the mounting plate 20 modularly interconnect in various configurations to form an uptight multi-computer monitor stand for mounting multiple computer monitors.

The multi-computer stand system 10 modularly assembles to form an upright stand capable of receiving a computer monitor at least by engagement of a first slide member of the at least two slide members 14 with a first face 12A (see FIGS. 7 and 7A) of the first elongated rail 12, engagement of a second slide member of the at least two slide members 14 with a second face 12B (see FIGS. 7 and 7A) of the elongated rail 12, engagement of an end of a first base member 18A of the at least two base members 18 with an end of a first elongated leg 16A of the at least two elongated legs 16, engagement of a second base member 18B of the at least two base members 18 with an opposite end of the first elongated leg 16A, engagement of the first slide member with an opposite end of the first base member 18A or the second base member 18B, and engagement of the mounting plate 20 with the second slide member.

Figure 5:
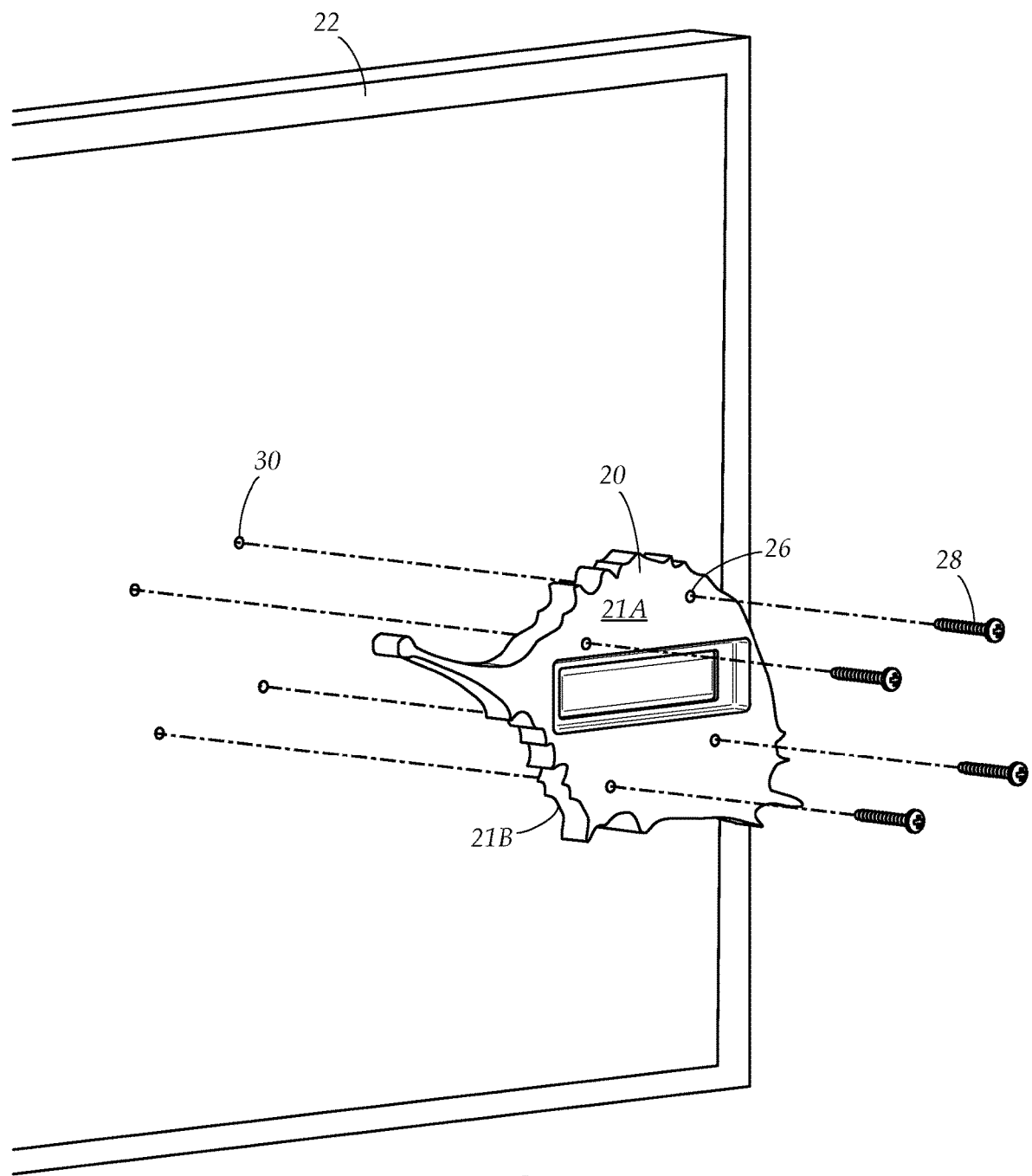
FIG. 5 is an exploded perspective view of a mounting plate of the multi-computer monitor stand system and a computer monitor, illustrating one manner in which the mounting plate attaches to a computer monitor according to one embodiment of the present disclosure.

Referring now to FIG. 5, the mounting plate 20 is configured to detachably connect to a computer monitor 22. The mounting plate 20 includes a first surface 21A and a second surface 21B opposite the first surface 21A. The mounting plate 20 includes a plurality of apertures 26 extending transversely through the mounting plate 20 from the first surface 21A to the second surface 21B. The plurality of apertures 26 are configured to receive fasteners 28 therethrough to connect the mounting plate 20 to the rear of the computer monitor 22 via the computer monitor's 22 own mounting apertures 30. The plurality of apertures 26 are positioned on the mounting plate 20 so as to allow universal attachment of the mounting plate 20 to any type of computer monitor. The second surface 21B is planar such that when the mounting plate 20 is attached to the computer monitor 22, the second surface 21B is contiguous with the surface of the computer monitor 22 (see FIG. 7B).

Figure 6:
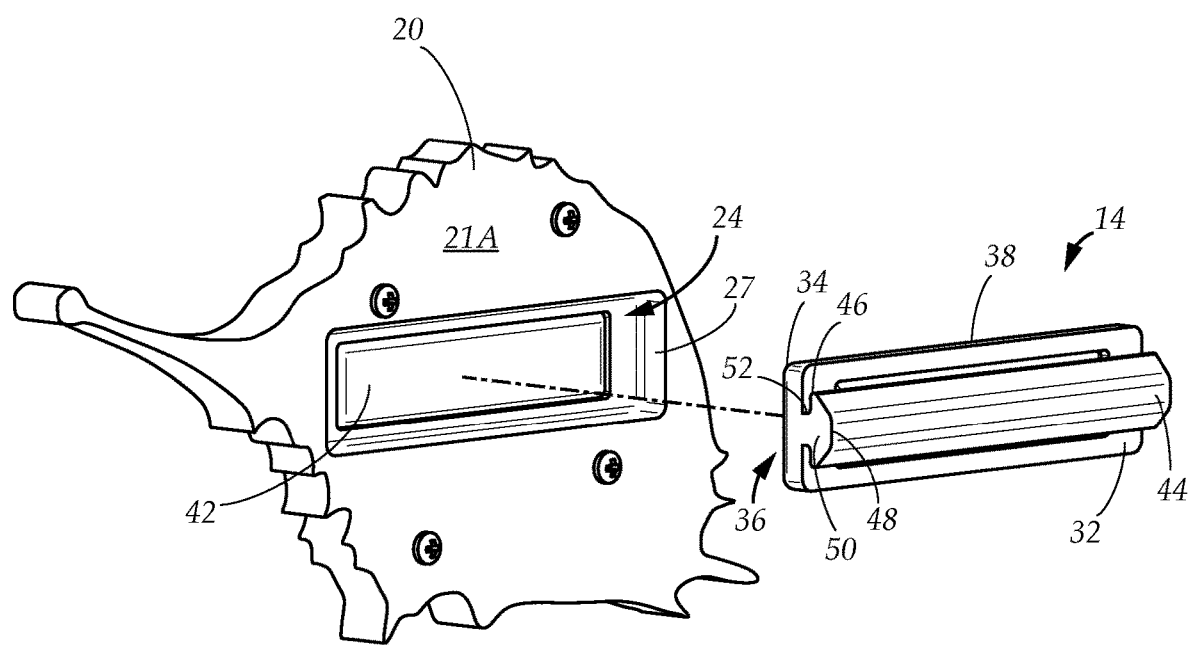
FIG. 6 is an exploded perspective view of a mounting plate and a slide member of the multi-computer monitor stand system, illustrating one manner in which the mounting plate and the slide member detachably connect to each other according to one embodiment of the present disclosure.

Referring now to FIG. 6, the mounting plate 20 comprises an interlocking region 24 that detachably engages the slide members 14. The interlocking region 24 is disposed on the first surface 21A of the mounting plate 20. The slide members 14 include a first side 32 and a second side 34 opposite the first side 32. The second side 34 includes an interlocking region 36 that detachably engages the interlocking region 24 of the mounting plate 20. The interlocking region 36 of the slide members 14 defines a body 38. The interlocking region 24 of the mounting plate 20 defines a recess 27 sized to receive the body 38 of the slide members 14 flush therein. The body 38 mates with the recess 27 to detachably connect the slide members 14 and the mounting plate 20 in a fixed position. The interlocking region 36 of slide members 14 comprises a magnet 40 (see FIGS. 7 and 7B) and the interlocking region 24 of the mounting plate 20 comprises a magnet 42 (see also FIG. 7B). The magnet 40 of the interlocking region 36 of the slide members 14 and the magnet 42 of the interlocking region 24 of the mounting plate 20 magnetically engage to lock the body 38 of the interlocking region 36 of the slide members 14 within the recess 27 of the interlocking region 24 of the mounting plate 20 and detachably connect the slide members 14 and the mounting plate 20 to each other.

The first side 32 of the slide members 14 comprise a projection 44 extending outwardly therefrom. The projection 44 comprises a proximal end 46 affixed to the body 38 of the slide member 14 and a distal end 48. The distal end 48 defines a joint 50 that tapers away from the body 38, or from the proximal end 46 to the distal end 48. The projection 44 forms a channel 52 between the distal end 48 and the joint 50. In some embodiments, the joint 50 tapers to form a dovetail shape.

Figure 7:
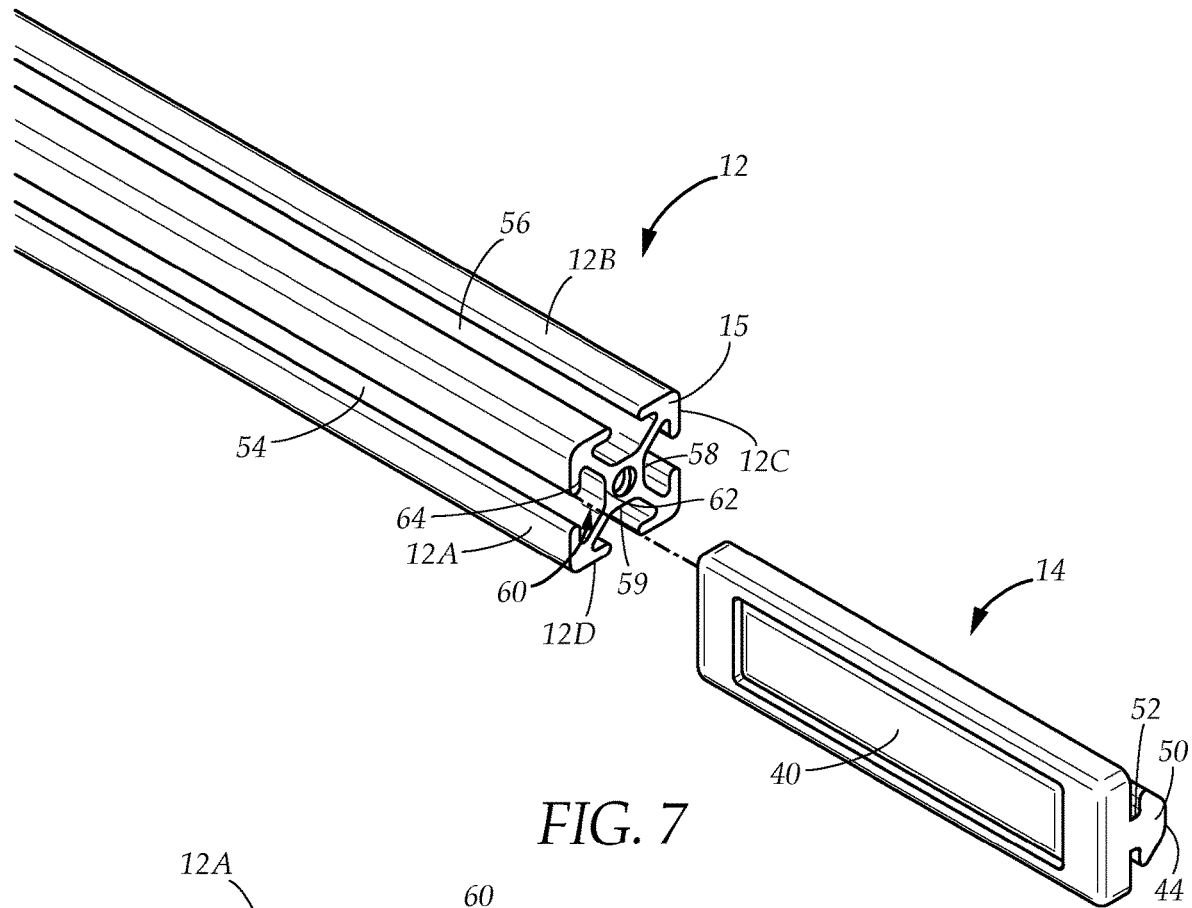
FIG. 7 is an exploded perspective view of a slide member and an elongated rail of the multi-computer monitor stand system, illustrating one manner in which the slide member and the elongated rail detachably connect to each other according to one embodiment of the present disclosure.
Figure 7A:
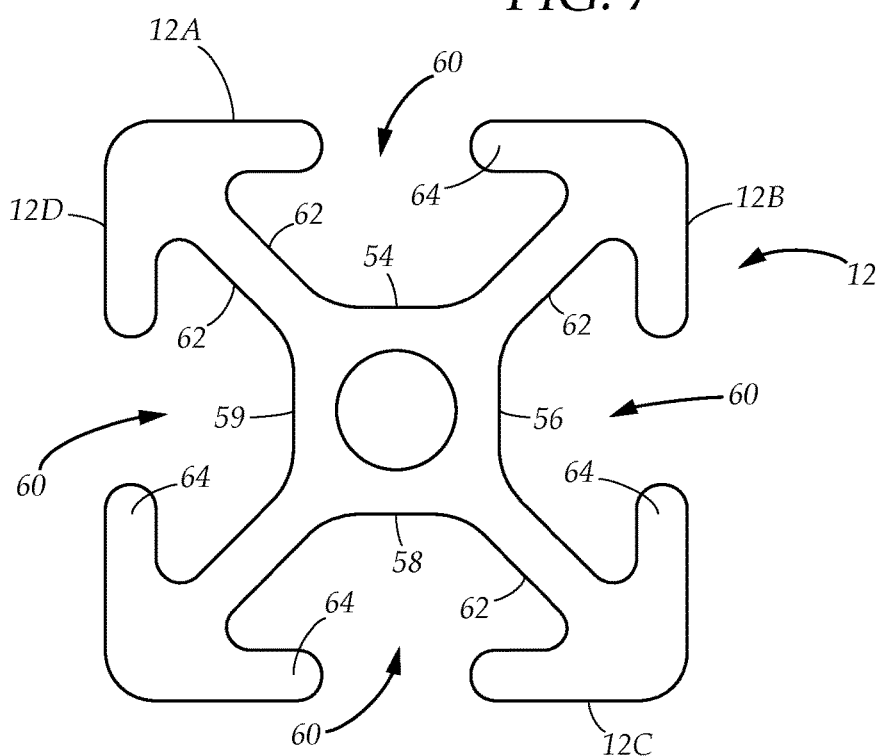
FIG. 7A is a cross-sectional view of an elongated rail of the multi-computer monitor stand system, illustrating the structure and configuration of the grooves of the elongated rail according to one embodiment of the present disclosure.
Figure 7B:
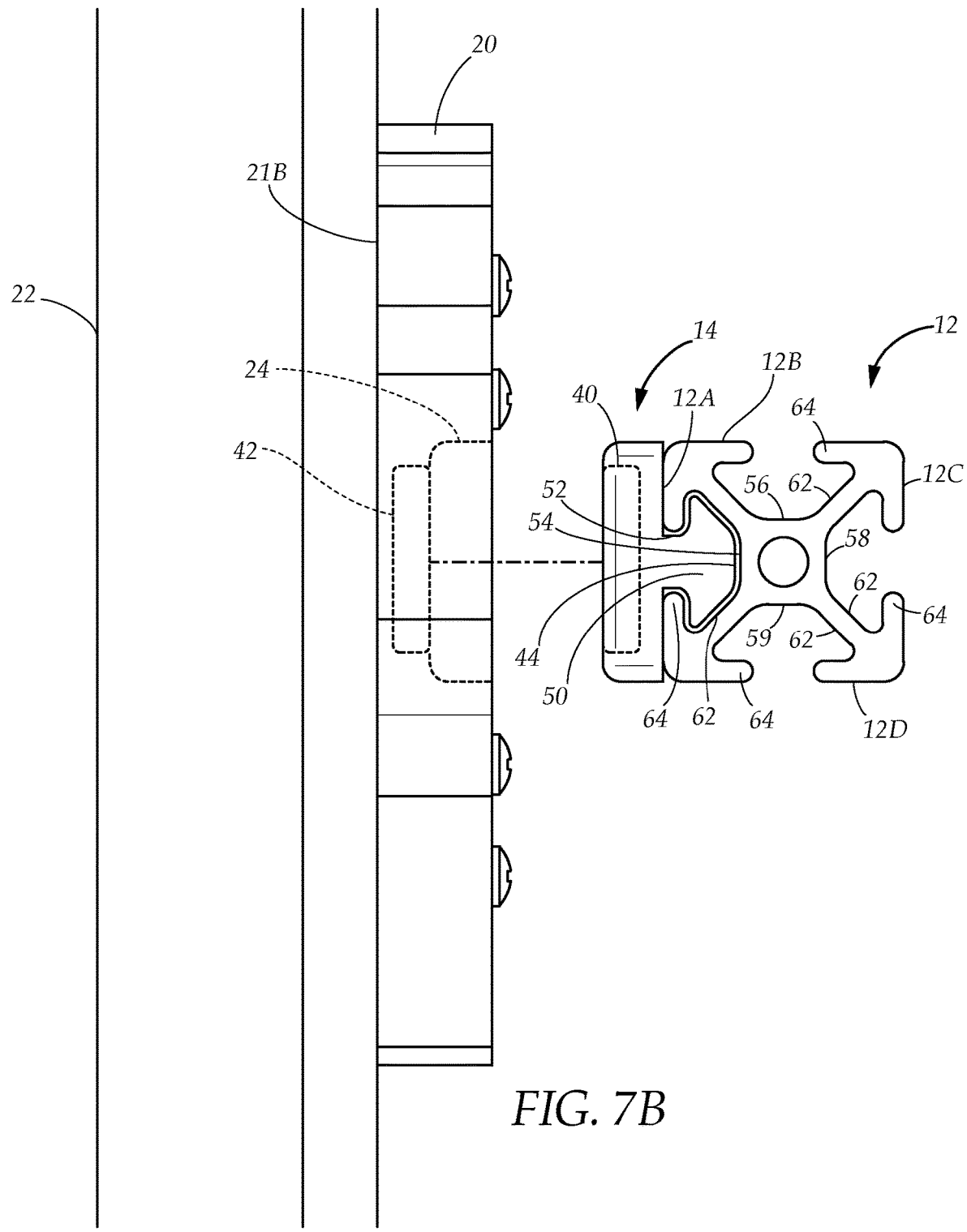
FIG. 7B is an exploded side view of a slide member and an elongated rail of the multi-computer monitor stand system, illustrating one manner in which the slide member and the elongated rail detachably connect to each other according to one embodiment of the present disclosure.

Referring now to FIGS. 7-7B, the elongated rail 12 comprises a first end 15, a second end 17 (see FIG. 4) opposite the first end 15, a longitudinal length extending from the first end 15 to the second end 17, a first face 12A extending between the first end 15 and the second end 17, a second face 12B extending between the first end 15 and the second end 17, a third face 12C extending between the first end 15 and the second end 17, and a fourth face 12D extending between the first end 15 and the second end 17. The first face 12A and the third face 12C are orthogonal relative to the second face 12B and the fourth face 12D. The first face 12A and the third face 12C are parallel to each other. The second face 12B and the fourth face 12D are parallel to each other.

The first face 12A comprises a first groove 54 extending longitudinally along the first face 12A from the first end 15 to the second end 17 of the elongated rail 12. The second face 12B comprises a second groove 56 extending longitudinally along the second face 12B from the first end 15 to the second end 17 of the elongated rail 12. The third face 12C comprises a third groove 58 extending longitudinally along the third face 12C from the first end 15 to the second end 17 of the elongated rail 12. The fourth face 12D comprises a fourth groove 59 extending longitudinally along the fourth face 12D from the first end 15 to the second end 17 of the elongated rail 12.

The first groove 54 and the third groove 58 are orthogonal relative to the second groove 56. The first groove 54 and the third groove 58 are parallel relative to each other. The second groove 56 and the fourth groove 59 are parallel to each other. The first groove 54, the second groove 56, the third groove 58, and the fourth groove 59 extend from the first end 15 to the second end 17 of the elongated rail 12 such that the first groove 54, the second groove 56, the third groove 58, and the fourth groove 59 are coterminous with the longitudinal length of the elongated rail 12. Each of the grooves 54, 56, 58, 59 extend entirely through the elongated rail 12 to define openings 60 at the first end 15 and at the second end 17 of the elongated rail 12. The openings 60 slidably receive the projections 44 of the slide members 14.

The first groove 54, the second groove 56, the third groove 58, and the fourth groove 59 each define a slot 62 and a flange 64. The slot 62 includes substantially the same cross-section as the joint 50 of the slide members so as to enable longitudinal movement of the joint 50 along the slot 62. The flange 64 protrudes inwardly toward the slot 62 to align with and fit within the channel 52 of the projection 44. The channel 52 prevent slide members 14 from transversely egressing out of the longitudinal rails by securing the joint 50 within the slot 62. In this way, the slide members 14 can support a computer monitor 22 on the elongated rail 12 when the computer monitor 22 is attached to slide member 14 via the mounting plate 20.

Figures 8, 8A:
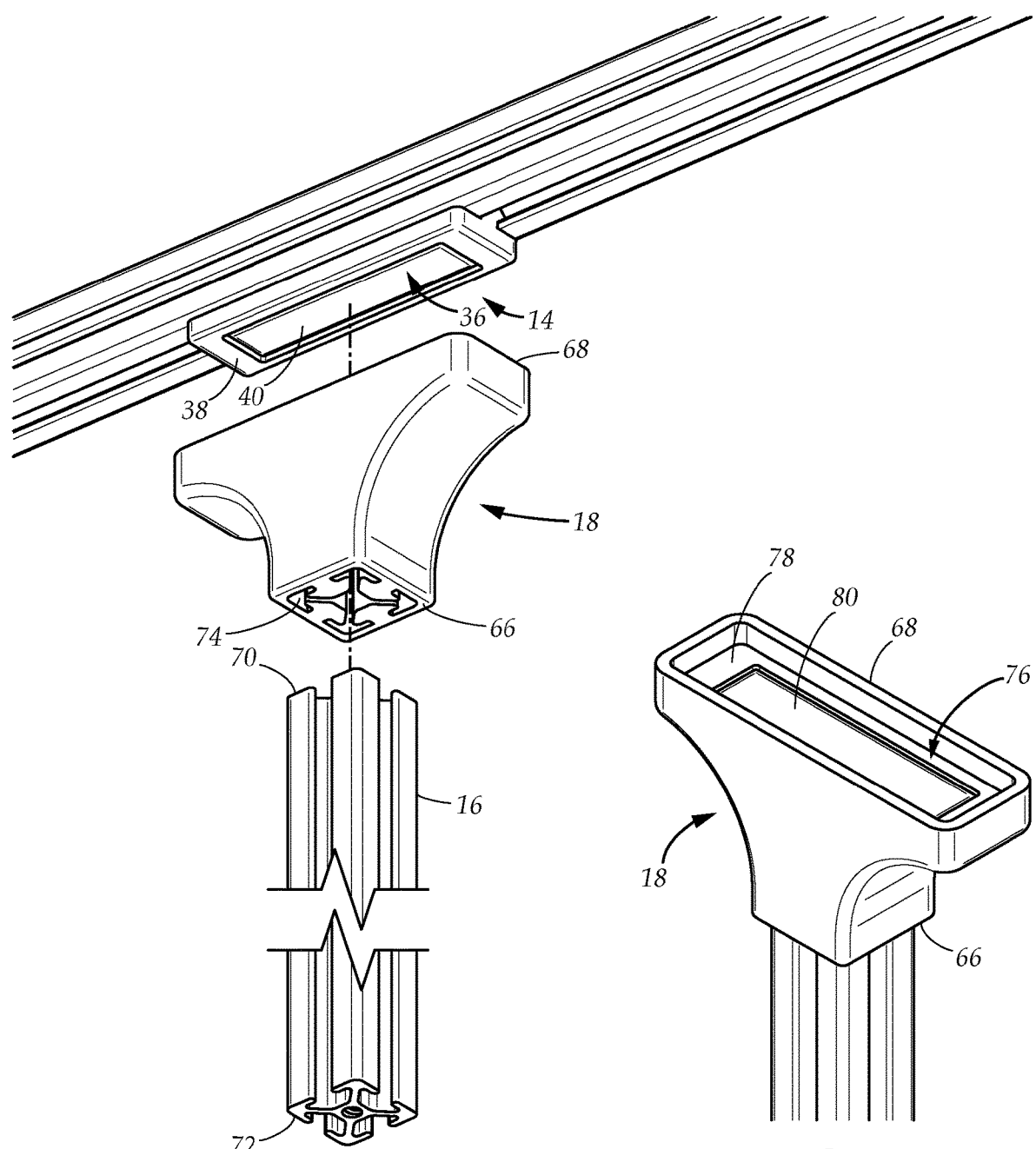
FIG. 8 is an exploded perspective view of a slide member connected to an elongated rail, a base member, and an elongated leg of the multi-computer monitor stand system, illustrating one manner in which the slide member, the base member, and the elongated leg modularly connect according to one embodiment of the present disclosure.
FIG. 8A is a top perspective view of the base member of the multi-computer monitor stand system, illustrating the interlocking region that receives and connects to the interlocking region of the slide member according to one embodiment of the present disclosure.
Figure 9:
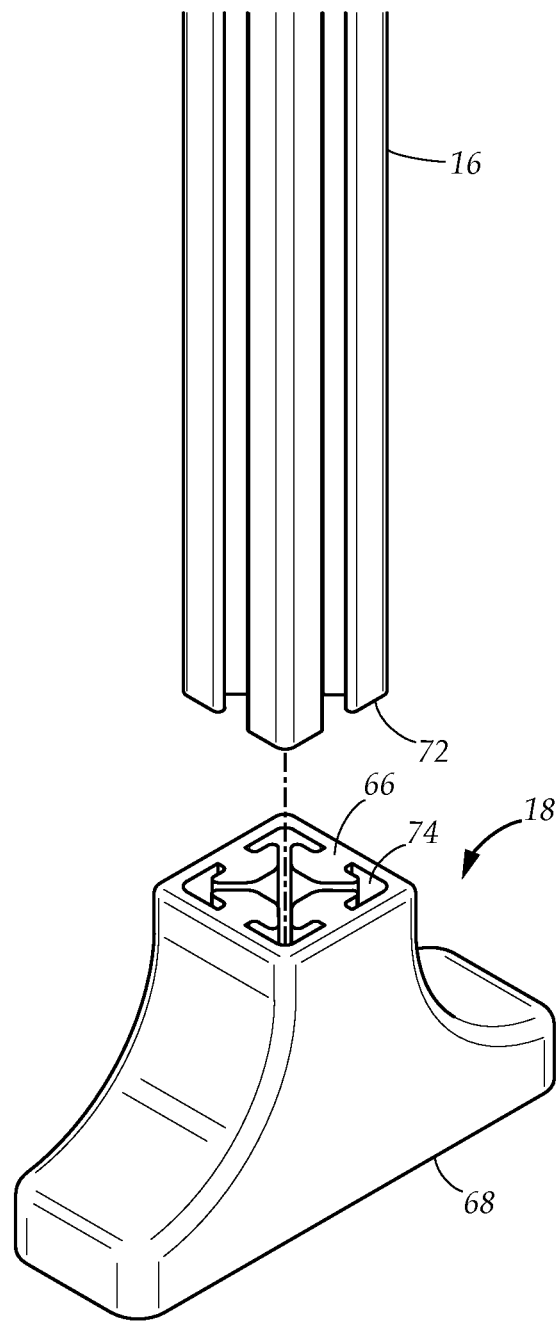
FIG. 9 is an exploded perspective view of an elongated leg and a base member of the multi-computer monitor stand system, illustrating one manner in which the elongated leg and the base member detachably connect to each other according to one embodiment of the present disclosure.

Referring now to FIGS. 8-9, the base members 18 comprise a first end 66 and a second end 68 opposite the first end 66. The second end 68 tapers in width to the first end 66 to form a wider second end 68 that makes contact with a support surface on which the stand system has been assembled and provides support to the stand system when positioned upright. The elongated legs 16 include a first end 70 and a second end 72. The first end 66 of the base members 18 include an interlocking receptacle 74 configured to detachably engage the first end 70 or the second end 72 of the elongated legs 16. The interlocking receptacle 74 includes substantially the same cross-section as the elongated legs 16 such that the interlocking receptacle 74 may mate with the elongated legs 16 and secure the elongated legs 16 therewithin via a friction fit.

The second end 68 of the base members 18 include an interlocking region 76 configured to detachably engage the interlocking region 36 of the slide members 14. The interlocking region 76 of the base members 18 comprise a recess 78 sized to receive the body 38 of the interlocking region 36 of the slide members 14 flush therein. The body 38 mates with the recess 78 of the base members 18 to detachably connect the slide members 14 and the base members 18 to each other. In embodiments, the recess 78 comprises a magnet 80 that magnetically engages the magnet 40 of the interlocking region 36 of the slide members 14 to lock the body 38 of the interlocking region 36 of the slide members 14 within the recess 78 to detachably connect the slide members 14 and the base members 18 to each other.

Figure 10:
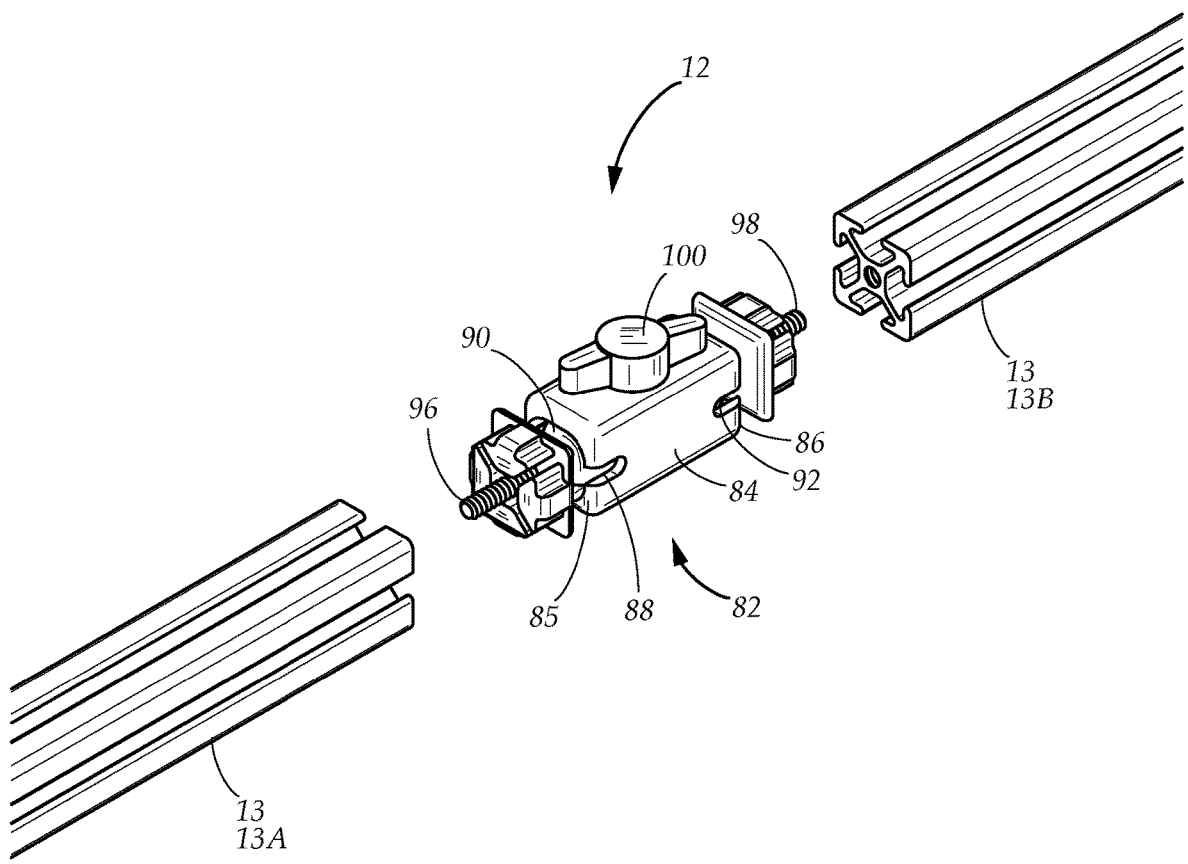
FIG. 10 is an exploded perspective view of the pivot and discrete rails of the elongated rail of the multi-computer monitor stand system, illustrating one manner in which the pivot joins the discrete rails of the elongated rail according to one embodiment of the present disclosure.
Figure 11:
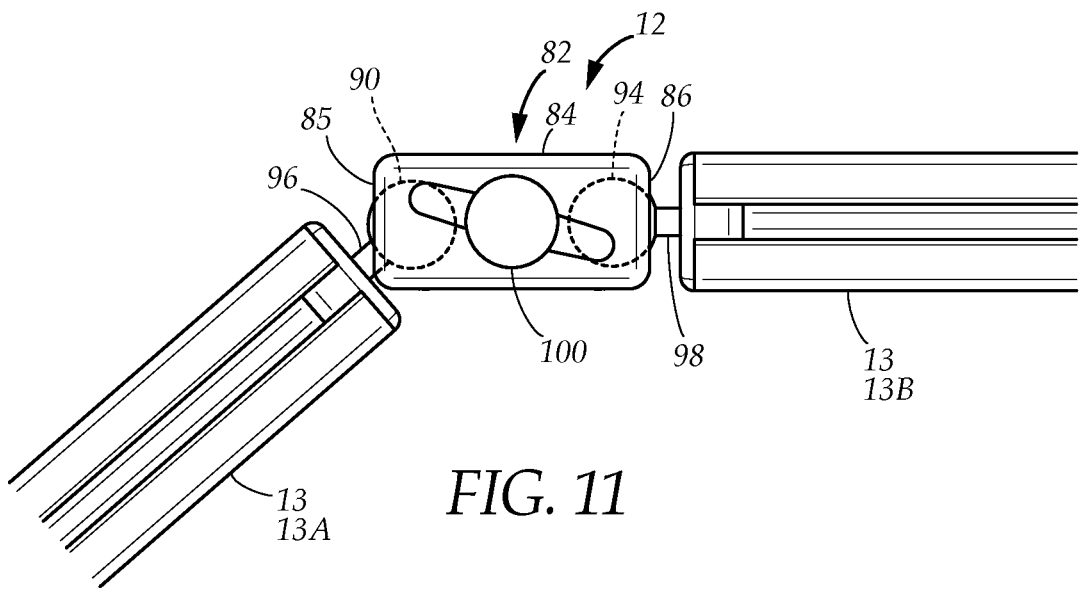
FIG. 11 is a top plan view of the pivot and the discrete rails of the elongated rail of the multi-computer monitor stand system, illustrating one manner in which the discrete rails can pivot about the pivot according to one embodiment of the present disclosure.
Figure 12:
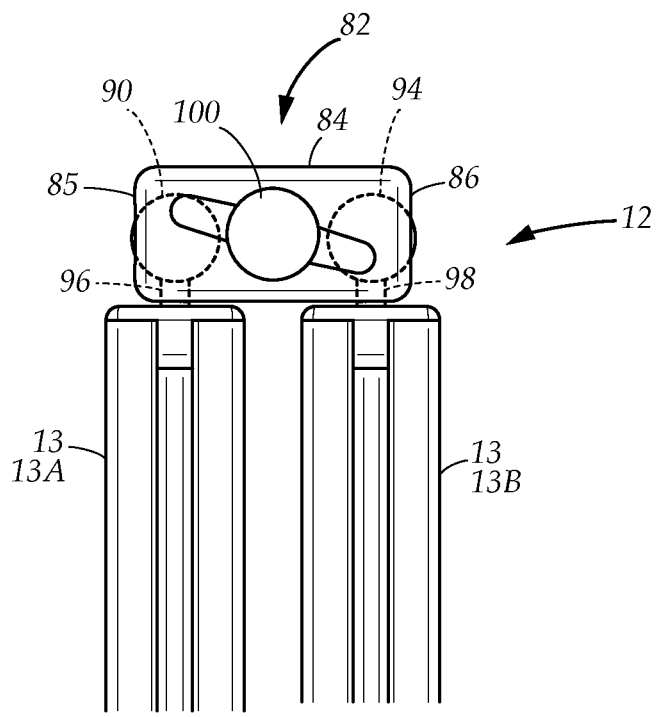
FIG. 12 is a top plan view of the pivot and the discrete rails of the elongated rail of the multi-computer monitor stand system, illustrating one manner in which the discrete rails can both pivot about the pivot according to one embodiment of the present disclosure.

Referring now to FIG. 10-12, the elongated rail 12 includes at least two discrete rails 13 and a pivot 82 connecting the discrete rails 13. The discrete rails 13 are coplanar and coaxial relative to each other and pivotable 180 degrees about the pivot 82 along a common plane. The pivot 82 comprises housing 84 including a first end 85 and a second end 86 opposing the first end 85. The first end 85 comprises a first socket 88 and a first ball joint 90 pivotally disposed within the first socket 88 and the second end 86 comprises a second socket 92 and a second ball joint 94 pivotally disposed within the second socket 92.

The first ball joint 90 is coupled to an end of a first discrete rail 13A of the discrete rails 13 via a threaded fastener 96 and the second ball joint 94 is coupled to an end of a second discrete rail 13B of the discrete rails 13 via threaded fastener 98. The pivot 82 is coplanar and coaxial with the first discrete rail 13A and the second discrete rail 13B. The first ball joint 90 pivots 180 degrees within the first socket 88 and the second ball joint 94 pivots 180 degrees within the second socket 92. In this way, the first discrete rail 13A and the second discrete rail 13B can pivot 180 degrees about the pivot 82.

In embodiments, the pivot 82 comprises a tightening mechanism 100 coupled to the housing 84 that releasably fastens the first ball joint 90 within the first socket 88 and the second ball joint 94 within the second socket 92. The tightening mechanism 100 enables the first ball joint 90 and the second ball joint 94 to be locked in position within the housing 84 to prevent the first discrete rail 13A and the second discrete rail 13B from pivoting. The tightening mechanism 100 may also be loosened to allow free movement of the first and second discrete rails 13A, 13B. In some embodiments, the tightening mechanism 100 comprises a threaded turnkey-type fastener extending through a width of the housing 84. Tightening of the fastener compress the housing 84 around the first and second ball joints 90, 94 to lock the first and second ball joints 90, 94 in position.

Referring back to FIGS. 1-4, in one operation, the elongated rail 12, the slide members 14 (see FIGS. 6, 7, 7B, 8), the elongated legs 16, the base members 18, and the mounting plate 20 may be modularly interconnected to form the multi-computer monitor stand 10 having one computer monitor 22 mounted thereon by slidably inserting the joint 50 (see FIG. 7) of a first slide member 14 within the first groove 54 (see FIGS. 7 and 7A) of a first discrete rail 13A of a first elongated rail 12F, slidably inserting the joint 50 of a second slide member 14 within the second groove 56 (see FIGS. 7 and 7A) of the first discrete rail 13A, mating the first end of a first elongated leg 16A with the interlocking receptacle 74 (see FIGS. 8 and 9) of a first base member 18A, mating the second end of the first elongated leg 16A with the interlocking receptacle 74 of a second base member 18B, mating the interlocking region 36 (see FIG. 6) of the first slide member 14 with the interlocking region 76 (see FIG. 8A) of the second base member 18B, attaching a first mounting plate 20A to a first computer monitor 22A, and mating the interlocking region 24 (see FIG. 6) of the first mounting plate 20A with the interlocking region 36 of the second slide member 14.

In another operation, to increase the capacity of the stand system 10 to hold multiple computer monitors in a side-by-side configuration, the elongated rail 12, the slide members 14, the elongated legs 16, the base members 18, and the mounting plate 20 may be further modularly interconnected by slidably inserting the joint 50 of a third slide member 14 within the first groove 54 of a second discrete rail 13B of the first elongated rail 12F, slidably inserting the joint 50 of a fourth slide member 14 within the second groove 56 of the second discrete rail 13B of the first elongated rail 12F, mating the first end of a second elongated leg 16B with the interlocking receptacle 74 of a third base member 18C, mating the second end of the second elongated leg 18B with the interlocking receptacle 74 of a fourth base member 18D, mating the interlocking region 36 of the third slide member 14 with the interlocking region 76 of the fourth base member 18D, attaching a second mounting plate 20B to a second computer monitor 22B, and mating the interlocking region 24 of the second mounting plate 20B with the interlocking region 36 of the fourth slide member 14. This modular interconnection of the stand system 10 forms a multiple computer monitor setup having multiple computer monitors arranged side-by-side.

In yet another operation, to increase the capacity of the stand system 10 to hold multiple computer monitors in a stacked configuration, the elongated rail 12, the slide members 14, the elongated legs 16, the base members 18, and the mounting plate 20 may be further modularly interconnected by slidably inserting the joint 50 of a fifth slide member 14 within the third groove 58 (see FIGS. 7 and 7A) of either of the first discrete rail 13A or the second discrete rail 13B of the first elongated rail 12F, slidably inserting the joint 50 of a sixth slide member 14 within the first groove 54 of a first discrete rail 13A or second discrete rail 13B of a second elongated rail 12S, slidably inserting the joint 50 of a seventh slide member 14 within the second groove 56 of the first discrete rail 13A or the second discrete rail 13B of the second elongated rail 12S, mating the first end of a third elongated leg 16C with the interlocking receptacle 74 of a fifth base member 18E, mating the second end of the third elongated leg 16C with the interlocking receptacle 74 of a sixth base member 18F, mating the interlocking region 36 of the fifth slide member 14 with the interlocking region 76 of the fifth base member 18E to mount the third elongated leg 16C onto the first elongated rail 12F, mating the interlocking region 36 of the sixth slide member 14 with the interlocking region 76 of the sixth base member 18F to mount the second elongated rail 12B onto the third elongated leg 16C and position the second elongated rail 12S above the first elongated rail 12F in a stacked configuration, attaching a third mounting plate 20C to a third computer monitor 22C, and mating the interlocking region 24 of the third mounting plate 20C with the interlocking region 36 of the seventh slide member 14. This modular interconnection of the stand system 10 forms a multiple computer monitor setup having multiple computer monitors arranged in a stacked configuration.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a multi-computer monitor stand system for multi-computer monitor setups. The disclosure is illustrated by example in the drawing figures, and throughout the written description. It should be understood that numerous variations are possible, while adhering to the inventive concept. Such variations are contemplated as being a part of the present disclosure.

What is claimed is:

1. A multi-computer monitor stand system for modular assembly, comprising:
    an elongated rail including a first end, a second end, a longitudinal length extending from the first end to the second end, a first face extending between the first end and the second end, a second face extending between the first end and the second end, a first groove extending longitudinally along the first face, and a second groove extending longitudinally along the second face;
    at least two slide members including a first side and a second side, the first side opposite the second side, the first side including a projection slidably engageable with the first groove and the second groove, the second side including an interlocking region;
    at least two elongated legs including a first end and a second end;
    at least two base members including a first end and a second end, the first end including an interlocking receptacle configured to detachably engage the first end or the second end of the at least two elongated legs, the second end including an interlocking region configured to detachably engage the interlocking region of the at least two slide members; and
    a mounting plate including a first surface and a second surface, the first surface opposite the second surface, the first surface having an interlocking region configured to detachably engage the interlocking region of the at least two slide members, the second surface configured to receive a computer monitor thereon, the mounting plate interconnecting the at least two slide members with a computer monitor;
    wherein the at least two base members connect with the at least two elongated legs to support the elongated rail and the at least two slide members connect the mounting plate to the elongated rail to form an upright stand for holding multiple computer monitors.

2. The stand system of claim 1, wherein the elongated rail includes at least two discrete rails and a pivot connecting the at least two discrete rails, the at least two discrete rails coplanar and coaxial relative to each other and pivotable 180 degrees about the pivot along a common plane.

3. The stand system of claim 2, wherein the elongated rail further comprises a third face extending between the first end and the second end, the third face opposite the first face, and a third groove extending longitudinally along the third face.

4. The stand system of claim 3, wherein:
    the first face and the second face are orthogonal relative to each other;
    the first face and the third face are parallel relative to each other;
    the first groove and the second groove are orthogonal relative to each other;
    the first groove and the third groove are parallel relative to each other;
    the first groove, the second groove, and the third groove extend from the first end to the second end of the elongated rail such that the first groove, the second groove, and the third groove are coterminous with the longitudinal length of the elongated rail and define an opening at the first end and at the second end of the rail that slidably receives the projection of the slide member.

5. The stand system of claim 4, wherein:
    the projection of the slide member includes a proximal end and a distal end, the distal end defining a joint tapering away from the proximal end, the projection including a channel disposed between the distal end and the joint; and
    the first groove, the second groove, and the third groove each define a slot and a flange, the slot including substantially the same cross-section as the joint so as to enable longitudinal movement of the joint along the slot, the flange protruding inwardly toward the slot to fit within the channel of the projection to prevent the joint from transversely egressing out of the slot.

6. The stand system of claim 5, wherein:
    the interlocking region of the at least two slide members comprises a body;
    the interlocking region of the second end of the at least two base members comprises a recess sized to receive the body flush therein, wherein the body mates with the recess to detachably connect the at least two slide members and the at least two base members.

7. The stand system of claim 6, wherein the interlocking receptacle of the first end of the at least two base members includes substantially the same cross-section as the at least two elongated legs such that the interlocking receptacle mates with the at least two elongated legs and engages the at least two elongated legs via a friction fit.

8. The stand system of claim 7, wherein:
the interlocking region of the mounting plate comprises a recess sized to receive the body of the at least two slide members flush therein,
wherein the body mates with the recess of the interlocking region of the mounting plate to detachably connect the at least two slide members and the mounting plate.

9. The stand system of claim 8, wherein:
the body of the interlocking region of the at least two slide members comprises a first magnet; and
the recess of the interlocking region of the at least two base members comprises a second magnet;
wherein the first magnet and the second magnet magnetically engage to lock the body within the recess and detachably connect the at least two slide members and the at least two base members.

10. The stand system of claim 9, wherein:
the recess of the interlocking region of the mounting plate comprises a third magnet;
wherein the first magnet and the third magnet magnetically engage to lock the body of the at least two slide members within the recess of the interlocking region of the mounting plate and detachably connect the at least two slide members and the mounting plate.

11. The stand system of claim 10, wherein the second end of the at least two base members tapers in width to the first end of the at least two base members to form a wider second end that makes contact with a support surface on which the upright stand has been formed and provides support to the stand when positioned upright.

12. The stand system of claim 11, wherein:
the mounting plate comprises a plurality of apertures extending through the mounting plate from the first surface to the second surface, the plurality of apertures configured to receive fasteners therethrough and positioned so as to allow universal attachment of the mounting plate to any type of computer monitor; and
the second surface is planar to contiguously receive a computer monitor thereon when the mounting plate is fastened to the computer monitor.

13. The stand system of claim 12, wherein the pivot comprises a first end including a first ball joint and a second end including a second ball joint, the first end opposing the second end, the first ball joint coupled to a first discrete rail of the at least two discrete rails of the elongated rail and the second ball joint coupled to a second discrete rail of the at least two discrete rails, the pivot coplanar and coaxial with the first discrete rail and the second discrete rail.

14. The stand system of claim 13, wherein the pivot further comprises a housing defining the first end and the second end, the first end including a first socket in which the first ball joint is pivotally disposed, the second end including a second socket in which the second ball joint is pivotally disposed, the first ball joint pivotable 180 degrees about the first socket and the second ball joint pivotable 180 degrees about the second socket, thereby enabling the first discrete rail to pivot 180 degrees about the pivot and the second discrete rail to pivot 180 degrees about the pivot.

15. The stand system of claim 14, wherein the pivot comprises a tightening mechanism coupled to the housing that fastens the first ball joint within the first socket and the second ball joint within the second socket so as to lock the first ball joint and the second ball joint in position and prevent the first discrete rail and the second discrete rail from pivoting.

16. The stand system of claim 15, wherein:
the projection of a first slide member of the at least two slide members is detachably engaged with the first groove;
the projection of a second slide member of the at least two slide members is detachably engaged with the second groove;
the interlocking receptacle of a first base member of the at least two base members is detachably engaged with the first end of a first elongated leg of the at least two elongated legs;
the interlocking receptacle of a second base member of the at least two base members is detachably engaged with the second end of the first elongated leg;
the interlocking region of the first slide member is detachably engaged with the interlocking region of either of the first base member or the second base member; and
the interlocking region of the mounting plate is detachably engaged with the interlocking region of the second slide member.

17. The stand system of claim 16, wherein:
the joint of the projection of a first slide member of the at least two slide members is slidably inserted within the first groove of a first discrete rail of a first elongated rail;
the joint of the projection of a second slide member of the at least two slide members is slidably inserted within the second groove of the first discrete rail;
the first end of the first elongated leg of the at least two elongated legs is detachably mated with the interlocking receptacle of the first base member of the at least two base members;
the second end of the first elongated leg is detachably mated with the interlocking receptacle of a second base member of the at least two base members;
the interlocking region of the first slide member is detachably mated with the interlocking region of the second base member;
a first mounting plate of the mounting plate is removably attached to a first computer monitor; and
the interlocking region of the first mounting plate is detachably engaged with the interlocking region of the second slide member, thereby forming a computer monitor setup having a computer monitor thereon.

18. The stand system of claim 17, wherein:
the joint of the projection of a third slide member of the at least two slide members is slidably inserted within the first groove of a second discrete rail of the first elongated rail;
the joint of the projection of a fourth slide member of the at least two slide members is slidably inserted within the second groove of the second discrete rail;
the first end of a second elongated leg of the at least two elongated legs is detachably mated with the interlocking receptacle of a third base member of the at least two base members;
the second end of the second elongated leg is detachably mated with the interlocking receptacle of a fourth base member of the at least two base members;

the interlocking region of the third slide member is detachably engaged with the interlocking region of the fourth base member;

a second mounting plate of the mounting plate is removably attached to a second computer monitor; and the interlocking region of the second mounting plate is detachably engaged with the interlocking region of the fourth slide member to form a multiple computer monitor setup having multiple computer monitors arranged side-by-side, thereby forming a multiple computer monitor setup having multiple computer monitors arranged in a side-by-side configuration.

19. The stand system of claim 18, wherein:

the joint of the projection of a fifth slide member of the at least two slide members is slidably inserted within the third groove of either of the first discrete rail or the second discrete rail of the first elongated rail;

the joint of the projection of a sixth slide member of the at least two slide members is slidably inserted within the first groove of a first discrete rail or second discrete rail of a second elongated rail;

the joint of the projection of a seventh slide member of the at least two slide members is slidably inserted within the second groove of the first discrete rail or the second discrete rail of the second elongated rail;

the first end of a third elongated leg of the at least two elongated legs is detachably mated with the interlocking receptacle of a fifth base member of the at least two base members;

the second end of the third elongated leg is detachably mated with the interlocking receptacle of a sixth base member of the at least two base members;

the interlocking region of the fifth slide member is detachably mated with the interlocking region of the fifth base member to mount the third elongated leg onto the first elongated rail;

the interlocking region of the sixth slide member is detachably engaged with the interlocking region of the sixth base member to mount the second elongated rail onto the third elongated leg and position the second elongated rail above the first elongated rail in a stacked configuration;

a third mounting plate of the mounting plate is removably attached to a third computer monitor; and the interlocking region of the third mounting plate is detachably engaged with the interlocking region of the seventh slide member, thereby forming a multiple computer monitor setup having multiple computer monitors arranged in a stacked configuration.

20. A method of modularly interconnecting the system of claim 1 to form an upright multi-computer monitor stand having a computer monitor mounted thereon, comprising:

slidably inserting the projection of a first slide member of the at least two slide members within the first groove of the elongated rail;

slidably inserting the projection of a second slide member of the at least two slide members within the second groove of the elongated rail;

mating the first end of a first elongated leg of the at least two elongated legs with the interlocking receptacle of a first base member of the at least two base members;

mating the second end of the first elongated leg with the interlocking receptacle of a second base member of the at least two base members;

mating the interlocking region of the first slide member with the interlocking region of the second base member;

attaching a first mounting plate to a first computer monitor; and mating the interlocking region of the first mounting plate with the interlocking region of the second slide member to form a multiple computer monitor setup having a computer monitor thereon.

\* \* \* \* \*